United States Patent
Ichihashi et al.

(10) Patent No.: US 8,469,907 B2
(45) Date of Patent: Jun. 25, 2013

(54) SLIDER

(75) Inventors: Satoru Ichihashi, Tochigi (JP);
Yoshihisa Matsuoka, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 248 days.

(21) Appl. No.: 13/074,313

(22) Filed: Mar. 29, 2011

(65) Prior Publication Data
US 2011/0243645 A1    Oct. 6, 2011

(30) Foreign Application Priority Data

Mar. 31, 2010    (JP) .................................. 2010-082944

(51) Int. Cl.
*A61H 1/00* (2006.01)
*F16C 19/00* (2006.01)

(52) U.S. Cl.
USPC .................... 601/34; 601/33; 601/35; 384/58

(58) Field of Classification Search
USPC ...... 601/5, 23, 27, 31, 33, 34, 35; 623/47–56, 623/32, 39; 602/5, 23, 32, 36; 384/19, 58; 16/87 16/R, 87.4 R, 87.6 R, 90, 91, 94 R, 96 R, 16/97, 98, 103, 104, 106, 107
See application file for complete search history.

(56) References Cited

U.S. PATENT DOCUMENTS

| | | | | |
|---|---|---|---|---|
| 692,629 A | * | 2/1902 | Coburn | 104/108 |
| 3,438,599 A | * | 4/1969 | Welzen | 244/216 |
| 4,408,369 A | * | 10/1983 | Labelle | 16/102 |
| 5,542,149 A | * | 8/1996 | Yu | 16/87.4 R |
| 5,568,672 A | * | 10/1996 | Mullet et al. | 16/94 R |
| 7,534,218 B2 | * | 5/2009 | Hiki | 602/16 |
| 7,938,791 B2 | * | 5/2011 | Shishido | 602/23 |
| 2002/0193713 A1 | * | 12/2002 | Lee | 601/99 |

FOREIGN PATENT DOCUMENTS

JP    2009-247605    10/2009

* cited by examiner

*Primary Examiner* — Justine Yu
*Assistant Examiner* — Michael Tsai
(74) *Attorney, Agent, or Firm* — Rankin, Hill & Clark LLP

(57) ABSTRACT

A slider configured to reduce the wear of rotating bodies and an arc-shaped rail. The slider 32 includes: an insertion portion 321 inserted into the arc-shaped rail 31 through the slit 314; a first rotating body 342 which rolls on the outer peripheral wall 312, and a second rotating body 341 which rolls on the inner peripheral wall 311, wherein the second rotating body 341 includes a pair of lateral rotating bodies 411 disposed in both ends in the width direction and a central rotating body 412 disposed in the central portion in the width direction so as to be displaced in the sliding direction from the lateral rotating bodies 411 and wherein the lateral rotating bodies 411 and the central rotating body 412 are pivotally supported by a pivot member 51 provided so as to be swingable in the sliding direction in an insertion portion 321.

6 Claims, 6 Drawing Sheets

SLIDER

BACKGROUND OF THE INVENTION

1. Field of the Invention

The present invention relates to a slider sliding in an arc-shaped rail shaped from a metal plate-like member.

2. Description of the Related Art

Conventionally, there has been known an arc-shaped rail such as, for example, one for use in a walking assist device (for example, refer to Japanese Patent Laid-Open No. 2009-247605). This walking assist device has a seat member on which a user is seated in a straddling manner and a pair of left and right leg links that support the seat member from below. Each leg link is coupled to the seat member so as to be swingable in the front-rear direction relative to the seat member via a curve guide mechanism.

The curve guide mechanism includes an arc-shaped rail coupled to the rear end portion of a support frame of the seat member via a spindle extending in the front-rear direction so as to be swingable in the lateral direction and a slider sliding along the arc-shaped rail and fixed to the upper end portion of the leg link.

The arc-shaped rail includes: an inner peripheral wall on the inner peripheral side near the center of curvature; an outer peripheral wall on the outer peripheral side far from the center of curvature; a pair of side walls coupling the inner peripheral wall to the outer peripheral wall on both sides in the width direction (lateral direction) orthogonal to the longitudinal direction (front-rear direction) of the arc-shaped rail and to the direction of the radius of curvature (vertical direction) of the arc shape; and a slit formed in the central portion in the width direction of the outer peripheral wall, and the arc-shaped rail is formed with a C-shaped cross section. The outer peripheral wall is divided into two parts by the slit.

The slider has an insertion portion, which is inserted into the arc-shaped rail through the slit of the arc-shaped rail. The insertion portion has an inner rotating body in contact with the inner peripheral wall of the arc-shaped rail and an outer rotating body in contact with the outer peripheral wall of the arc-shaped rail.

A pair of outer rotating bodies are provided spaced apart from each other in the width direction of the arc-shaped rail so as to be in contact with a pair of outer peripheral walls divided by the slit.

The conventional arc-shaped rail has been shaped by extrusion molding by using aluminum in terms of weight reduction. The arc-shaped rail made of aluminum, however, has the problem of poor strength, though the weight reduction is achieved.

Therefore, it is conceivable to manufacture the arc-shaped rail by bending a metal plate-like member made of a high tension material (high-tensile steel plate) or the like by the spinning process or the like.

Further, it is conceivable to improve the wear resistance of the rotating bodies and the arc-shaped rail by increasing the number of rotating bodies of the slider to disperse a force transmitted between the slider and the arc-shaped rail.

Manufacturing the arc-shaped rail by bending the metal plate-like member, however, easily causes slight warpage of the respective walls due to a machining error or the like. In the case of slight warpage, some of the rotating bodies are unable to come in contact with the corresponding peripheral wall and the wear resistance is reduced.

Therefore, it is an object of the present invention to provide a slider capable of reducing the wear of the rotating bodies and the arc-shaped rail by bringing all rotating bodies into appropriate contact with the arc-shaped rail manufactured by using a metal plate-like member.

SUMMARY OF THE INVENTION

The present invention is a slider movable in a sliding direction, which is a direction along a hollow arc-shaped rail, which has an arc-shaped inner peripheral wall and outer peripheral wall, a pair of side walls coupling the inner peripheral wall to the outer peripheral wall at side edges thereof, and a slit formed along a longitudinal direction in the central portion of the inner peripheral wall or the outer peripheral wall, the arc-shaped rail being shaped by bending a metal plate-like member, the slider comprising: an insertion portion inserted into the arc-shaped rail through the slit; a pair of first rotating bodies, which are provided in the insertion portion and in rollable contact with each of a pair of divided peripheral wall portions of the peripheral wall in which the slit is formed, and which is divided on both sides in the width direction by the slit; and a second rotating body, which is provided in the insertion portion and in rollable contact with the peripheral wall facing the peripheral wall in which the slit is formed, wherein the second rotating body includes a pair of lateral rotating bodies, which are disposed in both ends in the width direction of the peripheral wall facing the peripheral wall in which the slit is formed, and a central rotating body disposed in the central portion in the width direction, wherein the insertion portion includes a pivot member, on which the lateral rotating bodies and the central rotating body are disposed so as to be displaced from each other in the sliding direction and which rotatably supports the lateral rotating bodies and the central rotating body, and wherein the pivot member is pivotally supported in the insertion portion so as to be swingable in the sliding direction.

According to the present invention, the second rotating body is composed of the pair of lateral rotating bodies and the central rotating body, and therefore a contact area with the peripheral wall increases in comparison with the case where the second rotating body is composed of only the pair of lateral rotating bodies, thereby dispersing a force transmitted between the slider and the arc-shaped rail and improving the wear resistance of the rotating bodies and the arc-shaped rail.

Further, the pivot member pivotally supports the pair of lateral rotating bodies and the central rotating body, which constitute the second rotating body, with being displaced from each other in the sliding direction, and the pivot member is pivotally supported in the insertion portion so as to be swingable in the sliding direction. Therefore, for example, even in the case of slight warpage such as inward rising of the central portion in the width direction of the peripheral wall on which the second rotating body rolls, the pivot member swings to enable the pair of lateral rotating bodies and the central rotating body to be in appropriate contact with the peripheral wall. This prevents only some of the rotating bodies among the rotating bodies constituting the second rotating body from being in contact with the peripheral wall and enables all of the rotating bodies constituting the second rotating body to be in appropriate contact with the peripheral wall, thereby reducing the wear of the rotating bodies and the peripheral wall.

In the slider of the present invention, preferably, the insertion portion includes a swing member, which extends in the width direction of the arc-shaped rail with being provided so as to be swingable in the radial direction of the arc-shaped rail in the central portion, and the pair of first rotating bodies are pivotally supported so as to be each rotatable at both ends of the swing member.

Forming the arc-shaped rail by bending a metal plate-like member sometimes causes a small difference in the bend angle between the divided peripheral wall portions. In this case, in the conventional slider, only one of the pair of first rotating bodies comes in contact with the corresponding divided peripheral wall portion and the other departs from the corresponding divided peripheral wall portion, thereby accelerating the wear of one of the first rotating bodies and one of the divided peripheral wall portions on which the first rotating body rolls.

Therefore, the first rotating bodies are pivotally supported at the ends of the swing member as described above, by which swinging of the swing member enables both of the first rotating bodies to be in appropriate contact with the corresponding divided peripheral wall portions even in the case of a small difference in the bend angle between the divided peripheral wall portions. This enables a reduction in the wear of the slider and the arc-shaped rail.

In the slider of the present invention, preferably, the pivot member includes a rotating shaft extending in the width direction of the arc-shaped rail so as to be swingable in the radial direction of the arc-shaped rail in the central portion, and the pair of lateral rotating bodies are pivotally supported so as to be each rotatable at both ends of the rotating shaft.

Forming the arc-shaped rail by bending a metal plate-like member sometimes causes slight warpage such as inward rising of the central portion in the width direction of the peripheral wall on which the pair of lateral rotating bodies roll. In this case, a small difference may occur in the inward inclination angle between both ends in the width direction of the peripheral wall on which the pair of lateral rotating bodies roll.

With the pair of lateral rotating bodies being pivotally supported at both ends of the rotating shaft swingable in the radial direction as described above, both of the lateral rotating bodies are able to be in appropriate contact with the peripheral wall even in the case of a small difference in the inclination angle, thereby reducing the wear of the slider and the arc-shaped rail.

In the case of swinging the first rotating bodies by using a swing member, preferably the peripheral surface of each first rotating body is formed with an arc-shaped cross section. A flat peripheral surface of the first rotating body as in the conventional one causes the edge of the outer peripheral surface of the first rotating body to come in contact with the divided peripheral wall portion at the time of swinging of the swing member, which accelerates the wear. With the peripheral surface of the first rotating body being formed with an arc-shaped cross section as described above, contact area is able to be always maintained constant also in the case of swinging of the swing member, thereby reducing the wear.

The arc-shaped rail, in which the slider of the present invention slides, is preferably formed based on the dimensions of the inner surface of the arc-shaped rail. The slider of the present invention slides by a rolling motion of the rotating bodies disposed in the arc-shaped rail. Therefore, the dimension accuracy of the inner surface of the arc-shaped rail is improved in comparison with an arc-shaped rail formed based on the dimensions of the outer surface of the arc-shaped rail, and therefore the slider is able to slide smoothly along the arc-shaped rail.

The arc-shaped rail, in which the slider of the present invention slides, is able to be formed by bending a metal plate-like member by the spinning process.

DESCRIPTION OF THE PREFERRED EMBODIMENTS

Figure 1:
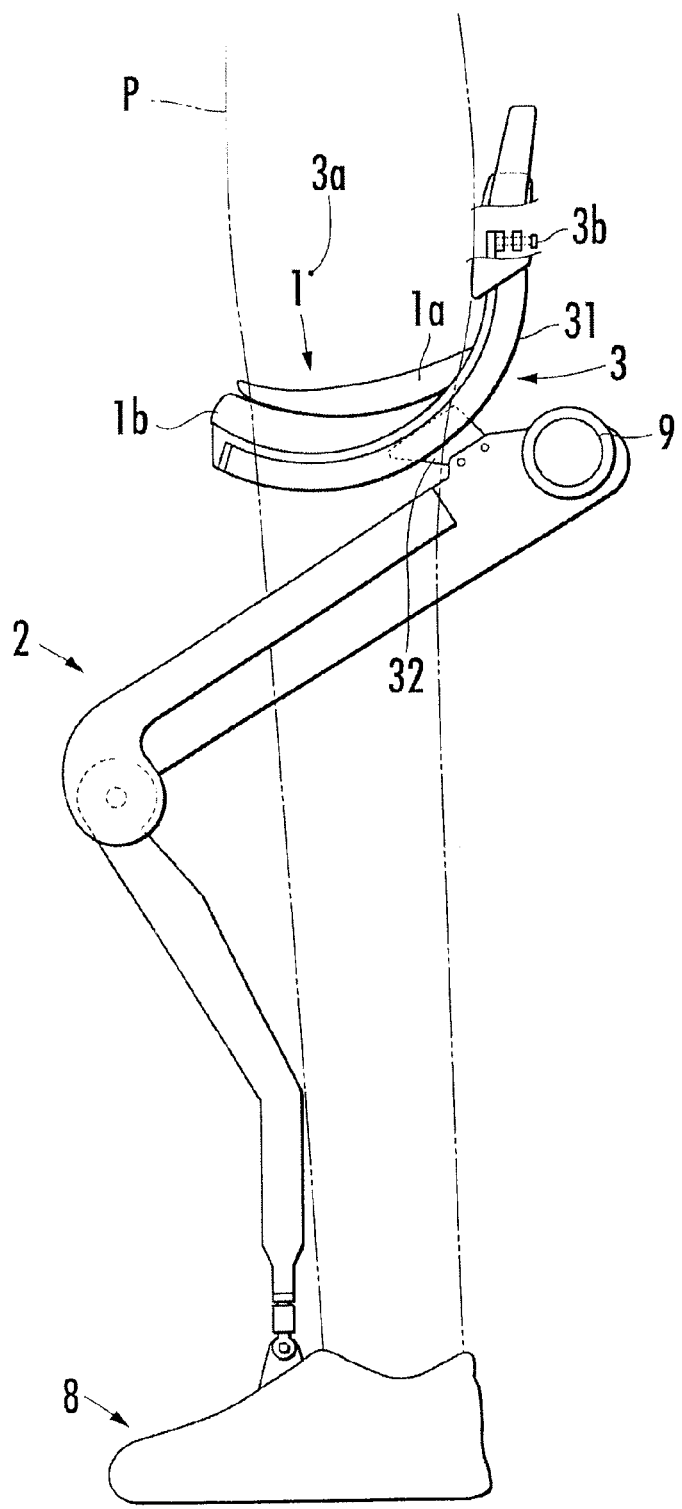
FIG. 1 is a side view illustrating a walking assist device with a slider according to an embodiment of the present invention.

A slider of an embodiment of the present invention will be described hereinafter with reference to FIGS. 1 to 5. The slider of this embodiment is for use in a walking assist device illustrated in FIG. 1. The walking assist device includes a seat member 1 on which a user P is seated in a straddling manner, as illustrated in FIG. 1, and a pair of left and right leg links 2 that support the seat member 1 from below.

Each leg link 2 is coupled to the seat member 1 so as to be swingable in the front-rear direction via a curve guide mechanism 3 described later. Shoes 8 to be put on the left and right feet of the user P are coupled to the leg links 2 at the lower ends thereof.

The leg links 2 are each equipped with a drive source 9. Rotational drive of the drive source 9 applies a force in the stretching direction to each leg link 2 to generate a supporting force for supporting at least a part of the weight of the user P (hereinafter, referred to as a weight relief assist force). The weight relief assist force generated by each leg link 2 is transmitted to the body of the user P via the seat member 1 and the load on the legs of the user P is thereby reduced.

The curve guide mechanism 3 includes an arc-shaped rail 31, which is coupled to the rising portion at the rear end of a support frame 1b of the seat member 1 so as to be swingable in the lateral direction via a spindle 3b extending in the front-rear direction, and a slider 32 fixed to the upper end portion of the leg link 2. The center of curvature 3a of the arc shape of the arc-shaped rail 31 is located on the upper side of the upper surface of a seat portion 1a of the seat member 1.

Figure 2:
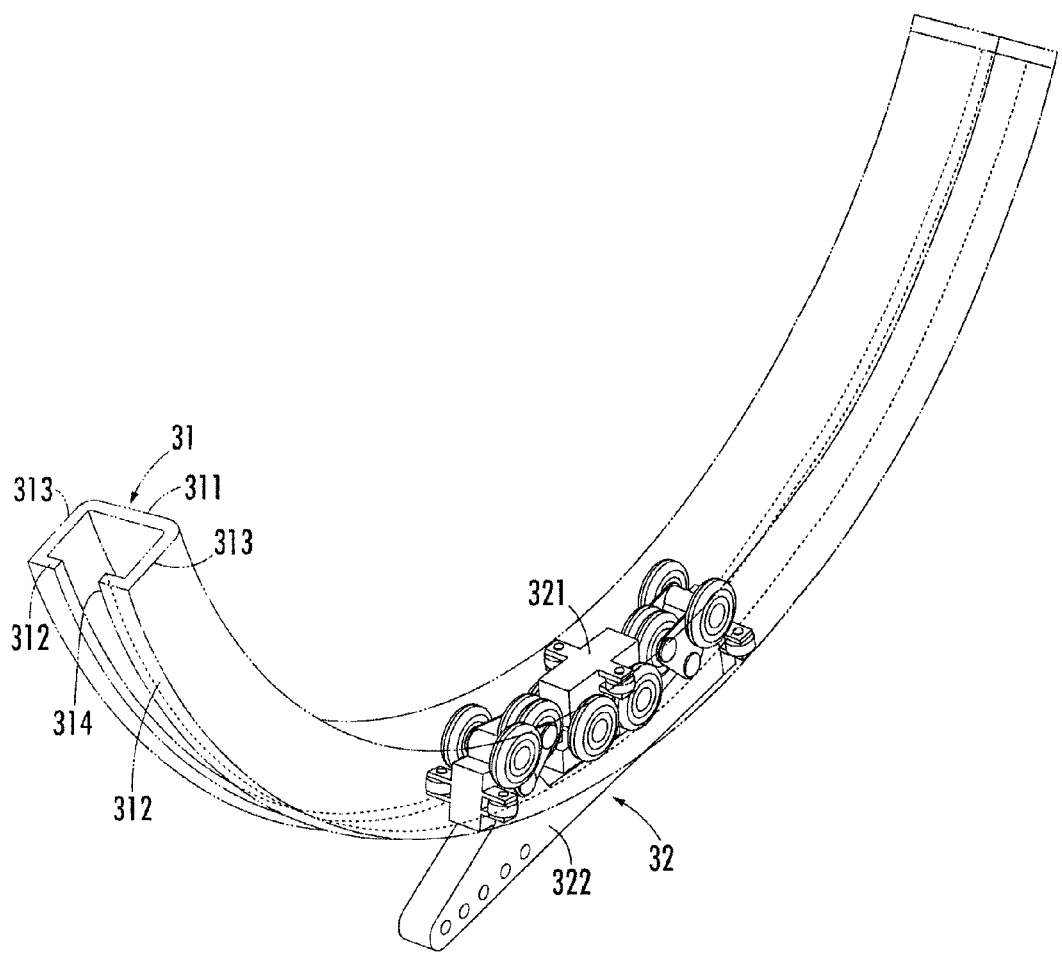
FIG. 2 is a perspective view illustrating a curve guide mechanism according to an embodiment of the present invention.
Figure 3:
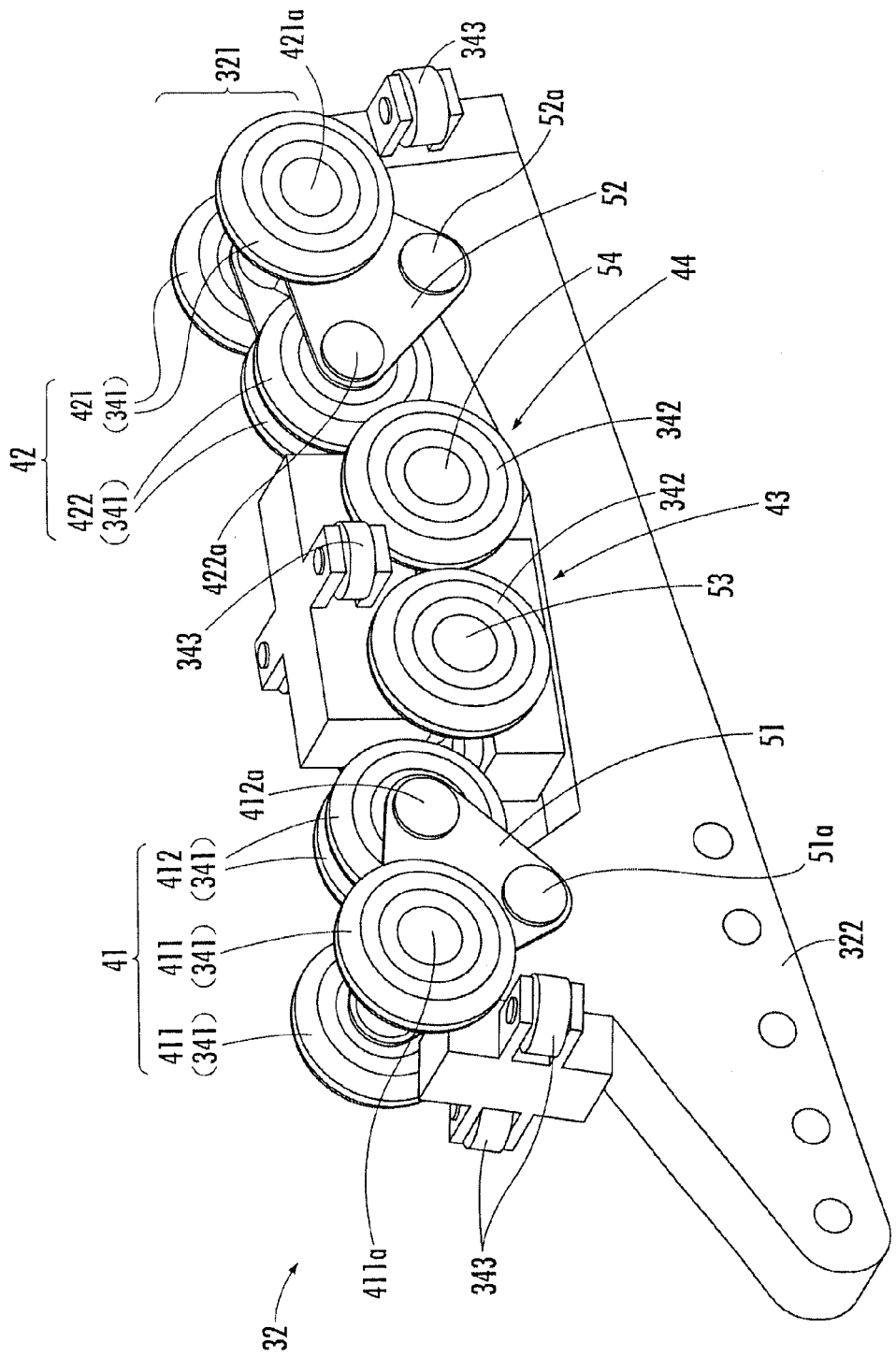
FIG. 3 is a perspective view illustrating the slider according to the embodiment of the present invention.

Hereinafter, the curve guide mechanism 3 will be described in detail with reference to FIGS. 2 and 3. The arc-shaped rail 31 includes: an inner peripheral wall 311 on the inner peripheral side near the center of curvature 3a; an outer peripheral wall 312 on the outer peripheral side far from the center of curvature 3a; a pair of side walls 313 and 313 coupling the inner peripheral wall 311 to the outer peripheral wall 312 on both sides in the width direction (lateral direction) orthogonal to the longitudinal direction (front-rear direction) of the arc-shaped rail 31 and to the direction of the radius of curvature (vertical direction) of the arc shape; and a slit 314 formed in the central portion in the width direction of the outer peripheral wall 312, and the arc-shaped rail is formed with a C-shaped cross section. The outer peripheral wall 312 is divided into two parts by the slit 314, and the divided outer peripheral walls 312 correspond to divided peripheral wall portions of the present invention.

The slider 32 has an insertion portion 321, which is inserted into the arc-shaped rail 31 through the slit 314, and a connection portion 322, which is connected to the leg link 2. The insertion portion 321 has eight inner rotating bodies (second rotating bodies) 341 in rollable contact with the inner peripheral wall 311 of the arc-shaped rail 31 from within, four outer rotating bodies (first rotating bodies) 342 in rollable contact with the outer peripheral wall 312 from within, and six horizontal rotating bodies 343 in rollable contact with the side walls of the arc-shaped rail 31 from within. The rolling motions of the rotating bodies 341, 342, and 343 enable the slider 32 to be slidable along the arc-shaped rail 31.

Four of the eight inner rotating bodies 341 are disposed in the front of the insertion portion 321, and for convenience of description, these four inner rotating bodies 341 are collectively defined as a front rotating body group 41. The remaining four inner rotating bodies 341 are disposed in the rear of the insertion portion 321, and for convenience of description, these four inner rotating bodies 341 are collectively defined as a rear rotating body group 42.

Two of the four inner rotating bodies constituting the front rotating body group 41 are located on the front side and disposed so as to be in contact with both ends in the width direction of the inner peripheral wall 311, and these rotating bodies correspond to a pair of lateral rotating bodies 411 in the embodiment. The remaining two inner rotating bodies 341 in the front rotating body group 41 are located on the rear side and disposed abreast so as to be in contact with the central portion in the width direction of the inner peripheral wall 311, and these rotating bodies correspond to central rotating bodies 412 in the embodiment.

In the front portion of the insertion portion 321, there is provided a substantially triangle-shaped front-side pivot member 51, which is swingable in the sliding direction (the direction in which the slider 32 slides in the arc-shaped rail 31: the front-rear direction) via a pivot shaft 51a. The pivot member 51 is fitted with a rotating shaft 411a of the pair of lateral rotating bodies 411 and a rotating shaft 412a of the pair of central rotating bodies 412. This enables the front rotating body group 41 to be swingable in the sliding direction via the pivot member 51.

The rear rotating body group 42 is formed so as to be symmetrical to the front rotating body group 41 with respect to the front-rear direction. Two of the four inner rotating bodies 341 constituting the rear rotating body group 42 are located on the rear side and disposed so as to be in contact with both ends in the width direction of the inner peripheral wall 311, and these rotating bodies correspond to a pair of lateral rotating bodies 421 in the embodiment. The remaining two inner rotating bodies 341 in the rear rotating body group 42 are located on the front side and disposed abreast so as to be in contact with the central portion in the width direction of the inner peripheral wall 311, and these rotating bodies correspond to central rotating bodies 422 in the embodiment.

In the rear portion of the insertion portion 321, there is provided a substantially triangle-shaped pivot member 52, which is swingable in the sliding direction via a pivot shaft 52a. The pivot member 52 is fitted with a rotating shaft 421a of a pair of lateral rotating bodies 421 and a rotating shaft 422a of the pair of central rotating bodies 422. This enables the rear rotating body group 42 to be swingable in the sliding direction via the pivot member 52.

As described above, the front rotating body group 41 and the rear rotating body group 42 include not only the pair of lateral rotating bodies 411 and 421 but also the pair of central rotating bodies 412 and 422, by which it is easier to disperse the force transmitted between the inner rotating bodies 341 and the inner peripheral wall 311, thereby improving the wear resistance of the inner rotating body 341 and the inner peripheral wall 311.

Figure 5A:
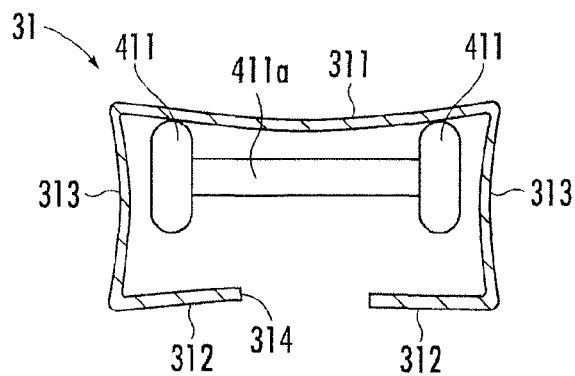
FIG. 5 is an explanatory diagram illustrating the states of rotating bodies of the embodiment swinging.
Figure 5B:
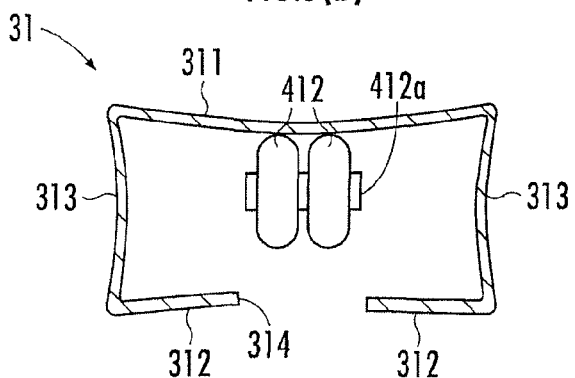

Moreover, the front rotating body group 41 and the rear rotating body group 42 are formed to be swingable in the sliding direction, and therefore, even in the case of slight warpage such as inward rising of the central portion in the width direction of the inner peripheral wall 311, all inner rotating bodies 341 are able to be brought into appropriate contact with the inner peripheral wall 311 as illustrated in FIGS. 5(a) and 5(b), thereby reliably improving the wear resistance of the inner rotating bodies 341 and the inner peripheral wall 311.

The four outer rotating bodies (first rotating bodies) 342 are disposed in the central portion of the insertion portion 321 between the front rotating body group 41 and the rear rotating body group 42. Two of the four outer rotating bodies 342 are located on the front side and disposed spaced apart from each other in the width direction of the arc-shaped rail 31 so as to be in contact with both outer peripheral walls 312 (divided peripheral wall portions) from within. For convenience of description, the two outer rotating bodies 342 are collectively defined as a front row 43.

The remaining two outer rotating bodies 342 are located on the rear side and disposed spaced apart from each other in the width direction of the arc-shaped rail 31 so as to be in contact with both outer peripheral walls 312 from within. For convenience of description, the two outer rotating bodies 342 are collectively defined as a rear row 44.

Figure 4:
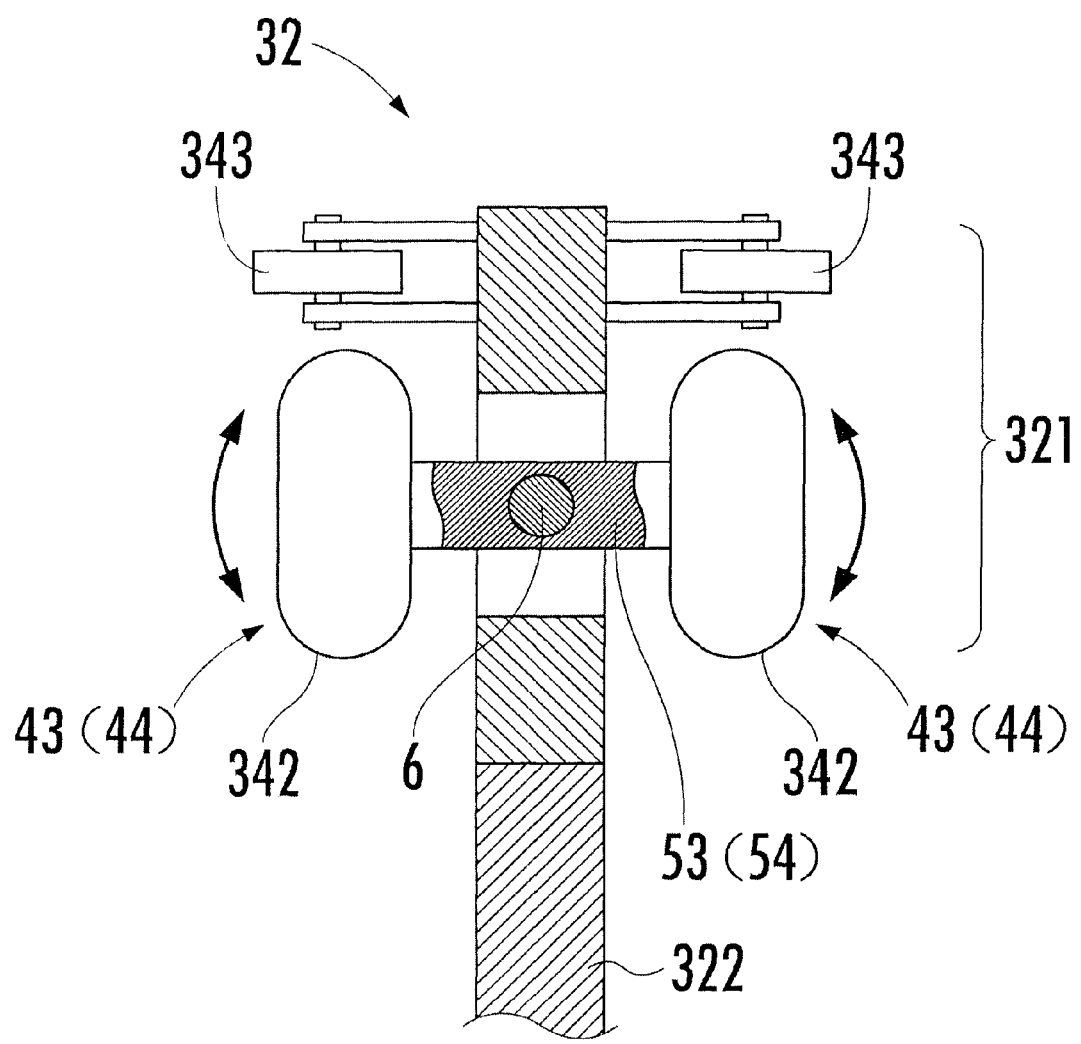
FIG. 4 is a cross section illustrating the slider according to the embodiment of the present invention.

The central portion between the front rotating body group 41 and the rear rotating body group 42 of the insertion portion 321 is provided with a pivot shaft 6 (See FIG. 4) extending in the front-rear direction. As illustrated in FIG. 4, the pivot shaft 6 pivotally supports a swing member 53, at both ends of which the outer rotating bodies 342 in the front row 43 are rotatably supported, so as to be swingable in the radial direction of the arc-shaped rail 31. Moreover, the pivot shaft 6 pivotally supports a swing member 54, at both ends of which the outer rotating bodies 342 in the rear row 44 are rotatably supported, so as to be swingable in the radial direction of the arc-shaped rail 31.

Figure 5C:
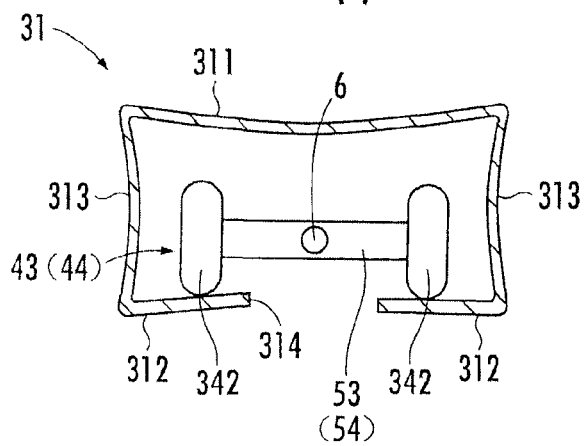

With the front row 43 and the rear row 44 formed so as to be swingable in the radial direction of the arc-shaped rail 31 in this manner, as illustrated in FIG. 5(c), the respective outer rotating bodies 342 are able to be brought into appropriate contact with the corresponding outer peripheral walls 312 due to swinging and tilting of the swing members 53 and 54 even in the case of a small difference in the bend angle between the outer peripheral walls 312, thereby reducing the wear of the outer rotating bodies 342 and the outer peripheral walls 312.

Moreover, the peripheral surface of each outer rotating body 342 is formed with an arc-shaped cross section. Thereby, contact area between the outer rotating bodies 342 and the outer peripheral walls 312 is able to be always maintained constant even in the case of swinging of the swing members 53 and 54, thereby reducing the wear of the outer rotating bodies 342 and the outer peripheral walls 312.

The peripheral surface of each inner rotating body 341 is also formed with an arc-shaped cross section. In the case where the peripheral surface is formed in a flat surface like the conventional inner rotating body, the edge portion of the side edge of the peripheral surface of each inner rotating body comes into contact with the warped inner peripheral wall 311, which accelerates the wear. With the peripheral surface of the inner rotating body formed with an arc-shaped cross section like the inner rotating body 341 in this embodiment, the edge portion is eliminated, thereby reducing the wear of the inner rotating body 341 and the inner peripheral wall 311.

Moreover, horizontal rotating bodies 343 are disposed in the front, center, and rear of the insertion portion 321 with two for each, namely six in total, thereby enabling the slider 32 to slide smoothly within the arc-shaped rail 31.

Further, the arc-shaped rail 31 is formed with an arc-shaped cross section, thereby reliably preventing foreign material such as pants from getting into the arc-shaped rail 31. Therefore, this formation prevents foreign material from being caught in the contact portions of the rotating bodies 341 and 342, thereby reliably ensuring the smooth swinging of the leg links 2.

The arc-shaped rail 31 of this embodiment is formed by bending a metal plate-like member having a ring shape by the spinning process and then cutting the metal plate-like member into a predetermined length. In this formation, the arc-shaped rail 31 based on the dimensions of the inner surface is able to be manufactured by using a ring-shaped core divisible in the circumferential direction and bending the metal plate-like member so as to wrap around the core. The metal plate-like member may be made of, for example, a high tension material (high-tensile steel plate).

If the arc-shaped rail is formed based on the dimensions of the outer surface, the slider 32 might be unable to slide smoothly within the arc-shaped rail due to inappropriate dimensions of the inner surface unless the arc-shaped rail is formed with accuracy including the thickness. If, however, the arc-shaped rail is formed based on the dimensions of the inner surface by using the core as described above, there is no need to consider the thickness, thereby improving the dimension accuracy of the inner surface contacted by the slider 32 and enabling the slider 32 to slide smoothly along the arc-shaped rail 31.

FIG. 6 presents a reference example. The outer peripheral walls 312 in FIG. 6 are indicated in the drawing as having larger bend angle than it actually has.

Figure 6A:
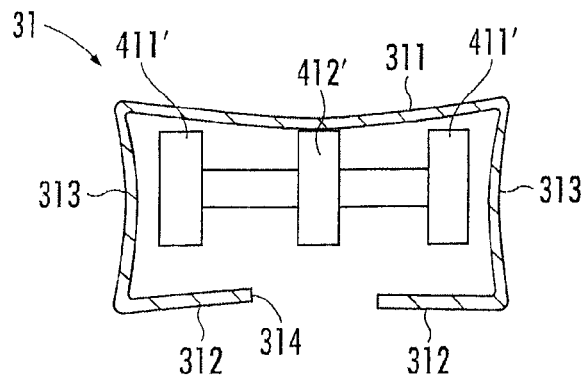
FIG. 6 is an explanatory diagram illustrating rotating bodies and an arc-shaped rail of a slider as a reference example.

FIG. 6(a) illustrates a slider with a pair of lateral rotating bodies 411' and 412' attached to the insertion portion without using a pivot member swingable in the sliding direction. As apparent from FIG. 6(a), the inner peripheral wall 311 of the arc-shaped rail 31 has a warpage of the central portion rising inward, and therefore it is understood that only a central rotating body 412' comes into contact with the inner peripheral wall 311 and a pair of lateral rotating bodies 411' are not in contact with the inner peripheral wall 311.

Figure 6B:
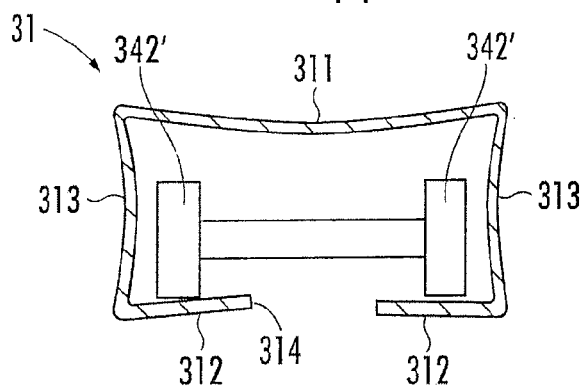

FIG. 6(b) illustrates a slider with a pair of inner rotating bodies 342' attached to the insertion portion without using a swing member swingable in the radial direction. As apparent from FIG. 6(b), if there is a difference in the bend angle between the outer peripheral walls 312 (divided peripheral wall portions), only one inner rotating body 342' is able to be in contact with the outer peripheral wall 312.

Figure 6C:
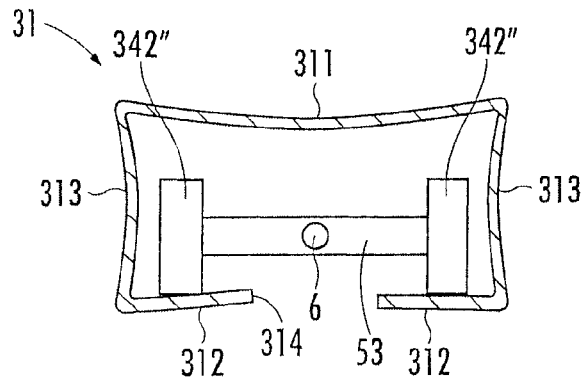

Outer rotating bodies 342" in FIG. 6(c) are formed with flat peripheral surfaces, unlike the outer rotating bodies in the front row 43 of this embodiment. As apparent from FIG. 6(c), the edge portion as the side edge of the peripheral surface of one outer rotating body 342" comes in contact with the outer peripheral wall 312.

While the arc-shaped rail 31 has been described by using an example of the rail having the outer peripheral wall 312 with the slit 314 for use in the walking assist device in this embodiment, the arc-shaped rail 31 is not limited thereto, but the slider 32 according to the present invention is also applicable to an arc-shaped rail with a slit 314 in the inner peripheral wall 311. In this structure, for example, the insertion portion 321 of the slider 32 may be upside down.

Moreover, the pair of lateral rotating bodies 411 and 421 may be configured to be swingable in the radial direction of the arc-shaped rail 31. In this case, similarly to the swing members 53 and 54 pivotally supporting the outer rotating bodies 342, which are the first rotating bodies, for example, each of the pivot members 51 and 52 may be provided with a pivot shaft extending in the sliding direction (the front-rear direction), so that the pivot shaft pivotally supports the rotating shaft 411a or 421a pivotally supporting the pair of lateral rotating bodies 411 or 421 so as to be swingable in the radial direction of the arc-shaped rail 31 in the central portion in the width direction.

Thereby, even in the case of slight warpage such as inward rising of the central portion in the width direction of the inner peripheral wall 311, on which the pair of lateral rotating bodies 411 and 421 roll, and a small difference in the bend angle between the both ends in the width direction of the inner peripheral wall 311, the lateral rotating bodies 411 and 421 are able to be brought into appropriate contact with the inner peripheral wall 311 to prevent the wear of the slider 32 and the arc-shaped rail 31.

What is claimed is:

1. A slider movable in a sliding direction, which is a direction along a hollow arc-shaped rail, which has an arc-shaped inner peripheral wall and outer peripheral wall, a pair of side walls coupling the inner peripheral wall to the outer peripheral wall at side edges thereof, and a slit formed along a longitudinal direction in the central portion of the inner peripheral wall or the outer peripheral wall so as to provide a pair of divided peripheral wall portions separated in a width direction by the slit, the width direction being transverse to the longitudinal direction, the arc-shaped rail being shaped by bending a metal plate member, the slider comprising:
   an insertion portion inserted into the arc-shaped rail through the slit;
   a pair of first rotating bodies, which are provided in the insertion portion and in rollable contact with the divided peripheral wall portions; and
   a second rotating body, which is provided in the insertion portion and in rollable contact with the peripheral wall facing the peripheral wall in which the slit is formed,
   wherein the second rotating body includes a pair of lateral rotating bodies, which are disposed at opposite ends in the width direction of the peripheral wall facing the peripheral wall in which the slit is formed, and a central rotating body disposed in a central portion in the width direction,
   wherein the insertion portion includes a pivot member, on which the lateral rotating bodies and the central rotating body are disposed so as to be displaced from each other in the sliding direction and which rotatably supports the lateral rotating bodies and the central rotating body, and
   wherein the pivot member is pivotally supported in the insertion portion so as to be swingable in the sliding direction.

2. The slider according to claim 1, wherein:
   the insertion portion includes a swing member extending in the width direction of the arc-shaped rail, the swing member being provided so as to be swingable in the radial direction of the arc-shaped rail in the central portion; and
   the pair of first rotating bodies are pivotally supported so as to be each rotatable at both ends of the swing member.

3. The slider according to claim 1, wherein:
   the pivot member includes a rotating shaft extending in the width direction of the arc-shaped rail, the rotating shaft being provided so as to be swingable in the radial direction of the arc-shaped rail in the central portion; and
   the pair of lateral rotating bodies are pivotally supported so as to be each rotatable at both ends of the rotating shaft.

4. The slider according to claim 2, wherein the peripheral surface of the first rotating body is formed with an arc-shaped cross section.

5. The slider according to claim 3, wherein the peripheral surface of the first rotating body is formed with an arc-shaped cross section.

6. An arc-shaped rail in which a slider slides, the arc-shaped rail being hollow and comprising:
an arc-shaped inner peripheral wall;
an outer peripheral wall;
a pair of side walls coupling the inner peripheral wall to the outer peripheral wall at side edges thereof; and
a slit formed along a longitudinal direction in the central portion of the inner peripheral wall or the outer peripheral wall so as to provide a pair of divided peripheral wall portions separated in a width direction by the slit, the width direction being transverse to the longitudinal direction,
wherein
the arc-shaped rail is formed by bending a metal plate member by the spinning process,
the slider includes an insertion portion, a pair of first rotating bodies, which are provided in the insertion portion, and a second rotating body, which is provided in the insertion portion, the second rotating body includes a pair of lateral rotating bodies and a central rotating body, the insertion portion includes a pivot member on which the lateral rotating bodies and the central rotating body are disposed so as to be displaced from each other in a sliding direction and which rotatably supports the lateral rotating bodies and the central rotating body, and the pivot member is pivotally supported in the insertion portion so as to be swingable in the sliding direction, and
the arc-shaped rail is configured to receive the insertion portion of the slider in the arc-shaped rail through the slit with the pair of first rotating bodies in rollable contact with the divided wall portions, the second rotating body in rollable contact with the peripheral wall facing the peripheral wall in which the slit is formed, the pair of lateral rotating bodies disposed at opposite ends in the width direction of the peripheral wall facing the peripheral wall in which the slit is formed, and the central rotating body disposed in a central portion in the width direction.

* * * * *